(12) United States Patent
Gilson et al.

(10) Patent No.: US 11,512,631 B2
(45) Date of Patent: Nov. 29, 2022

(54) GEARED GAS TURBINE ENGINE WITH REDUCED FAN NOISE

(71) Applicant: Raytheon Technologies Corporation, Farmington, CT (US)

(72) Inventors: Jonathan Gilson, West Hartford, CT (US); Bruce L. Morin, Longmeadow, MA (US); Ramons A. Reba, South Windsor, CT (US); David A. Topol, West Hartford, CT (US); Wesley K. Lord, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/399,309

(22) Filed: Aug. 11, 2021

(65) Prior Publication Data

US 2021/0372323 A1     Dec. 2, 2021

Related U.S. Application Data

(63) Continuation of application No. 16/867,668, filed on May 6, 2020, now Pat. No. 11,118,507, which is a (Continued)

(51) Int. Cl.
*F02C 3/10* (2006.01)
*F01D 9/04* (2006.01)
(Continued)

(52) U.S. Cl.
CPC .............. *F02C 3/107* (2013.01); *F01D 9/041* (2013.01); *F01D 25/162* (2013.01); *F02K 3/06* (2013.01);
(Continued)

(58) Field of Classification Search
CPC .... F04D 29/544; F04D 29/667; F04D 29/664; F04D 29/542; F01D 25/162; F01D 9/041;
(Continued)

(56) References Cited

U.S. PATENT DOCUMENTS

| 2,029,813 A | 2/1936 | De Mey |
| 2,258,792 A | 4/1941 | New |

(Continued)

FOREIGN PATENT DOCUMENTS

| EP | 0791383 | 8/1997 |
| EP | 1142850 | 10/2001 |

(Continued)

OTHER PUBLICATIONS

Honeywell LF507. Jane's Aero-engines, Aero-engines—Turbofan. Feb. 9, 2012.

(Continued)

*Primary Examiner* — Igor Kershteyn
(74) *Attorney, Agent, or Firm* — Carlson, Gaskey & Olds, P.C.

(57) ABSTRACT

A fan section for a gas turbine engine according to an example of the present disclosure includes, among other things, a fan rotor having fan blades, and a plurality of fan exit guide vanes positioned downstream of the fan rotor. The fan rotor is configured to be driven through a gear reduction. A ratio of a number of fan exit guide vanes to a number of fan blades is defined. The fan exit guide vanes are provided with optimized sweep and optimized lean.

30 Claims, 2 Drawing Sheets

Related U.S. Application Data continuation of application No. 16/143,662, filed on Sep. 27, 2018, now Pat. No. 10,655,538, which is a continuation of application No. 14/964,727, filed on Dec. 10, 2015, now Pat. No. 10,107,191, which is a continuation-in-part of application No. 13/408,382, filed on Feb. 29, 2012, now abandoned.

(51) Int. Cl.
  *F04D 29/54* (2006.01)
  *F01D 25/16* (2006.01)
  *F04D 29/66* (2006.01)
  *F02K 3/06* (2006.01)
  *F02C 3/107* (2006.01)

(52) U.S. Cl.
  CPC ......... *F04D 29/542* (2013.01); *F04D 29/544* (2013.01); *F04D 29/664* (2013.01); *F04D 29/667* (2013.01); *F05D 2220/36* (2013.01); *F05D 2250/191* (2013.01); *F05D 2250/38* (2013.01); *F05D 2260/40311* (2013.01); *F05D 2260/96* (2013.01); *F05D 2260/961* (2013.01); *F05D 2300/603* (2013.01)

(58) Field of Classification Search
  CPC ........ F02K 3/06; F02C 3/107; F05D 2220/36; F05D 2250/38; F05D 2250/191; F05D 2260/96; F05D 2260/961; F05D 2260/40311; F05D 2300/603
  See application file for complete search history.

(56) References Cited

U.S. PATENT DOCUMENTS

| | | |
|---|---|---|
| 2,936,655 A | 5/1960 | Peterson et al. |
| 2,962,260 A | 11/1960 | Foley |
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,363,419 A | 1/1968 | Wilde |
| 3,412,560 A | 11/1968 | Gaubatz |
| 3,536,414 A | 10/1970 | Smith, Jr. |
| 3,664,612 A | 5/1972 | Skidmore et al. |
| 3,673,802 A | 7/1972 | Krebs et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,883,264 A | 5/1975 | Rao |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,220,171 A | 9/1980 | Ruehr |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,883,240 A | 11/1989 | Adamson et al. |
| 4,916,894 A | 4/1990 | Adamson et al. |
| 4,969,325 A | 11/1990 | Adamson et al. |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,036,438 A | 3/2000 | Imai |
| 6,125,626 A | 10/2000 | El-Aini et al. |
| 6,205,432 B1 | 3/2001 | Gabbard |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,554,564 B1 | 4/2003 | Lord |
| 6,607,165 B1 | 8/2003 | Manteiga et al. |
| 6,709,492 B1 | 3/2004 | Spadaccini et al. |
| 6,814,541 B2 | 11/2004 | Evans et al. |
| 6,883,303 B1 | 4/2005 | Seda |
| 7,018,172 B2 | 3/2006 | Prasad et al. |
| 7,021,042 B2 | 4/2006 | Law |
| 7,074,006 B1 | 7/2006 | Hathaway et al. |
| 7,101,145 B2 | 9/2006 | Tsuchiya et al. |
| 7,219,490 B2 | 1/2007 | Dev |
| 7,328,580 B2 | 2/2008 | Lee et al. |
| 7,374,403 B2 | 5/2008 | Decker et al. |
| 7,540,354 B2 | 6/2009 | Morin et al. |
| 7,591,754 B2 | 9/2009 | Duong et al. |
| 7,607,287 B2 | 10/2009 | Reba et al. |
| 7,631,483 B2 | 12/2009 | Mani et al. |
| 7,632,064 B2 | 12/2009 | Somanath |
| 7,662,059 B2 | 2/2010 | McCune |
| 7,806,651 B2 | 10/2010 | Kennepohl et al. |
| 7,824,305 B2 | 11/2010 | Duong et al. |
| 7,828,682 B2 | 11/2010 | Smook |
| 7,832,981 B2 | 11/2010 | Hasan et al. |
| 7,926,260 B2 | 4/2011 | Sheridan et al. |
| 7,997,868 B1 | 8/2011 | Liang et al. |
| 8,333,559 B2 | 12/2012 | Bushnell |
| 8,869,508 B2 | 10/2014 | Blackwell et al. |
| 9,869,191 B2 | 1/2018 | Gallagher et al. |
| 2006/0228206 A1 | 10/2006 | Decker |
| 2007/0084218 A1 | 4/2007 | Udall |
| 2008/0003096 A1 | 1/2008 | Kohli et al. |
| 2008/0116009 A1 | 5/2008 | Sheridan et al. |
| 2008/0317588 A1 | 12/2008 | Grabowski et al. |
| 2009/0014581 A1 | 1/2009 | Kebrle et al. |
| 2009/0056343 A1 | 3/2009 | Suciu et al. |
| 2009/0304518 A1 | 12/2009 | Kodama et al. |
| 2009/0314881 A1 | 12/2009 | Suciu et al. |
| 2010/0080697 A1 | 4/2010 | Wojno et al. |
| 2010/0105516 A1 | 4/2010 | Sheridan et al. |
| 2010/0119366 A1 | 5/2010 | Bushnell |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2013/0219922 A1* | 8/2013 | Gilson .................. F04D 29/544 415/208.2 |
| 2015/0369127 A1* | 12/2015 | Gilson .................. F02K 1/827 415/119 |
| 2016/0327064 A1* | 11/2016 | Logue .................... F02C 7/045 |

FOREIGN PATENT DOCUMENTS

| | | |
|---|---|---|
| EP | 1517022 A2 | 3/2005 |
| GB | 1516041 | 6/1978 |
| GB | 2041090 | 9/1980 |
| GB | 2426792 | 12/2006 |

(56) References Cited

FOREIGN PATENT DOCUMENTS

| | | |
|---|---|---|
| GB | 2471845 A | 1/2011 |
| WO | 2007038674 | 4/2007 |
| WO | 2014/058478 A1 | 4/2014 |

OTHER PUBLICATIONS

Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14,17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

(56) References Cited

OTHER PUBLICATIONS

Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
"PurePower PW1000G Engine News," May 1, 2010.
European Search Report for European Application No. 16202986.2 dated Apr. 20, 2017.
European Search Report for European Application No. 13754643.8 dated Nov. 3, 2015.
International Search Report and Written Opinion for International Application No. PCT/US2013/026575 dated Jun. 25, 2013.
International Preliminary Report on Patentability for International Application No. PCT/US2013/026575 dated Sep. 12, 2014.
Gliebe et al., "Effects of Vane/Blade Ratio and Spacing on Fan Noise," Dec. 1983, NASA, NASA CR-174664, Summary.
Trent 1000 sales flier, Jan. 2010, Rolls-Royce, VCOM13797 Issue 6, Jan. 6, 2010.
Summons to Attend Oral Proceedings for EP Application No. 16202986.2 dated Jul. 3, 2020.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero angines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes- SolidWorks Corporation, pp. 1-156.

MacIsaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retreived Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study--vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-Con 94. Fort Lauderdale, FL May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93/0598. 31st Aerospace Sciences Meeting. Reno, NV. Jan. 11-14, 1993. pp. 1-30.

(56) References Cited

OTHER PUBLICATIONS

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Johnston, R.P., Hirschkron, R., Koch, C.C., Neitzel, R.E., and Vinson, P.W. (1978). Energy efficient engine: Preliminary design and integration study--final report. NASA CR-135444. Sep. 1978. pp. 1-401.

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 1-45, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

(56) References Cited

OTHER PUBLICATIONS

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Technical Report. (1975). Quiet Clean Short-haul Experimental Engine (QCSEE) UTW fan preliminary design. NASA-CR-134842. Feb. 1, 1975. pp. 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/CR-2003-212309. May 2003. pp. 1-52.
Haldenbrand, R. and Norgren, W.M. (1979). Airesearch QCGAT program [quiet clean general aviation turbofan engines]. NASA-CR-159758. pp. 1-199.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.comlAsset/psg_teflon_ptfe.pdf.
Anderson, N.E, Loewenthal, S.H., and Black, J.D. (1984). An analytical method to predict efficiency of aircraft gearboxes. NASA Technical Memorandum prepared for the Twentieth Joint Propulsion Conference. Cincinnati , OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.

(56) References Cited

OTHER PUBLICATIONS

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retrieved from https://geaviation.com/sites/default/files/datasheet-CF6-80C2.pdf.

Salemme, C.T. and Murphy, G.C. (1979). Metal spar/superhybrid shell composite fan blades. Prepared for NASA. NASA-CR-159594. Aug. 1979. pp. 1-127.

"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx™ high bypass turbofan engines. Retrieved from: https://www.geaviation.com/sites/default/files/datasheet-genx.pdf.

\* cited by examiner

GEARED GAS TURBINE ENGINE WITH REDUCED FAN NOISE

CROSS REFERENCE TO RELATED APPLICATION

This application is a continuation of U.S. application Ser. No. 16/867,668 filed 6 May 2020, which is a continuation of U.S. application Ser. No. 16/143,662 filed 27 Sep. 2018, now U.S. Pat. No. 10,655,538 granted 19 May 2020, which is a continuation of U.S. application Ser. No. 14/964,727 filed 10 Dec. 2015, now U.S. Pat. No. 10,107,191 granted 23 Oct. 2018, which is a continuation-in-part of U.S. application Ser. No. 13/408,382, filed 29 Feb. 2012.

BACKGROUND

This application relates to a gas turbine engine having a gear reduction driving a fan, and wherein exit guide vanes for the fan are provided with noise reduction features.

Gas turbine engines are known, and typically include a fan delivering air into a compressor section. The air is compressed and passed into a combustion section where it is mixed with fuel and ignited. Products of this combustion pass downstream over turbine rotors, and the turbine rotors are driven to rotate the compressor and fan.

Traditionally, a low pressure turbine rotor drives a low pressure compressor section and the fan rotor at the identical speed. More recently, a gear reduction has been provided such that the fan can be rotated at a reduced rate.

With this provision of a gear, the diameter of the fan may be increased dramatically to achieve a number of operational benefits. Increasing fan diameter, however, implies that the fan noise sources will dominate the total engine noise signature.

A major fan noise source is caused by rotating turbulent wakes shed from the fan interacting with the stationary guide vanes. The stationary guide vanes, or fan exit guide vanes are positioned downstream of the fan. A discrete, or tonal, noise component of this interaction is caused by the specific number of fan wakes interacting with the specific number of vanes in a periodic fashion. A random, or broadband, noise source is generated from the nature of turbulence inside each fan wake interacting with each guide vane.

At a given engine power condition, if the ratio of guide vanes to fan blades is lower than a critical value, the tonal noise is said to be "cut-on" and may propagate to an outside observer location, e.g. an observer location either in the aircraft or on the ground. If the ratio of guide vanes to fan blades is above the critical value, however, the tonal noise is said to be "cut-off." Total engine noise may be dominated by tonal and/or broadband noise sources resulting from the fan wake/guide vane interaction.

Traditional acoustic design addresses tonal noise by targeting a cut-off vane count for subsonic fan tip speeds. The broadband noise, however, may require a lower vane count to decrease the number of turbulent sources. For a given number of fan blades, lowering the vane count below a critical value creates a cut-on condition and thus higher tone noise levels.

Thus, there is a tradeoff between addressing the two types of noise.

While cut-off vane counts have been utilized in the past, they have not been known in an engine including the above-mentioned gear reduction.

SUMMARY

A fan section for a gas turbine engine according to an example of the present disclosure includes a fan rotor having 30 or fewer fan blades, and a plurality of fan exit guide vanes positioned downstream of the fan rotor. The fan rotor is configured to be driven through a gear reduction. A first ratio of a number of fan exit guide vanes to a number of fan blades is between about 0.8 and about 2.5. The fan exit guide vanes are provided with optimized sweep and optimized lean wherein optimized sweep means that: (a) an outer periphery of the fan exit guide vane is positioned to be downstream of a location of an inner periphery of the fan exit guide vane; and (b) a sweep angle is between about 5 degrees and about 35 degrees; and optimized lean means that: (a) an outer periphery of the fan exit guide vane is positioned at a greater circumferential distance than an inner periphery of the fan exit guide vane in a direction of rotation of the fan rotor; and (b) a lean angle is greater than 0 degrees and is less than or equal to about 15 degrees.

In a further embodiment of any of the forgoing embodiments, a bypass ratio is defined by the volume of air delivered by the fan rotor into a bypass duct compared to the volume directed to an associated compressor section, and the bypass ratio is greater than about 6.

In a further embodiment of any of the forgoing embodiments, the lean angle is greater than or equal to about 2 degrees.

In a further embodiment of any of the forgoing embodiments, the bypass ratio is greater than about 10.

In a further embodiment of any of the forgoing embodiments, the sweep angle is between about 15 degrees and about 25 degrees.

In a further embodiment of any of the forgoing embodiments, the lean angle is greater than or equal to about 7 degrees.

In a further embodiment of any of the forgoing embodiments, the lean angle is greater than or equal to about 7 degrees.

In a further embodiment of any of the forgoing embodiments, the fan rotor defines a pressure ratio less than about 1.45.

In a further embodiment of any of the forgoing embodiments, the fan rotor is configured such that a blade tip speed of each of the fan blades is less than about 1150 ft/second at a cruise condition.

In a further embodiment of any of the forgoing embodiments, the first ratio is less than about 2.0.

In a further embodiment of any of the forgoing embodiments, each of the fan exit guide vanes defines a hollow opening covered by an acoustic liner having a perforated face sheet. The face sheet has a thickness, and a diameter of holes in the face sheet is selected to be less than or equal to about (0.3) of the thickness. Holes in the face sheet result in at least about 5% of a surface area of the face sheet.

A gas turbine engine according to an example of the present disclosure includes a fan section having a plurality of fan blades. The fan section defines a pressure ratio less than about 1.45. A geared arrangement is configured to drive the fan section. A compressor section includes a first compressor section and a second compressor section. A turbine section includes a first turbine section configured to drive the first compressor section, and a second turbine section configured to drive the second compressor section and the geared arrangement. A plurality of exit guide vanes are positioned downstream of the fan blades. A first ratio of a number of exit guide vanes to a number of fan blades is between about 0.8 and about 2.5. The exit guide vanes are provided with optimized sweep and optimized lean wherein optimized sweep means that: (a) an outer periphery of the exit guide vane is positioned to be downstream of a location of an inner periphery of the exit guide vane; and (b) a sweep angle is between about 5 degrees and about 35 degrees; and optimized lean means that: (a) an outer periphery of the exit guide vane is positioned at a greater circumferential distance than an inner periphery of the exit guide vane in a direction of rotation of the fan blades; and (b) a lean angle is greater than 0 degrees and less than or equal to about 15 degrees.

In a further embodiment of any of the forgoing embodiments, the lean angle is greater than or equal to about 2 degrees, and the sweep angle is greater than or equal to about 20 degrees.

In a further embodiment of any of the forgoing embodiments, the fan section has 26 or fewer fan blades.

In a further embodiment of any of the forgoing embodiments, the geared arrangement defines a gear reduction ratio greater than or equal to about 2.3. A pressure ratio across the second turbine section is greater than or equal to about 5. The fan section is configured such that a blade tip speed of each of the fan blades is less than about 1150 ft/second at a cruise condition.

In a further embodiment of any of the forgoing embodiments, the first ratio is greater than or equal to about 2.0.

In a further embodiment of any of the forgoing embodiments, the first ratio is less than about 2.0.

In a further embodiment of any of the forgoing embodiments, each of the exit guide vanes defines a hollow opening covered by an acoustic liner having a perforated face sheet. The face sheet has a thickness, and a diameter of holes in the face sheet is selected to be less than or equal to about (0.3) of the thickness. Holes in the face sheet result in at least about 5% of a surface area of the face sheet.

A method of designing a gas turbine engine according to an example of the present disclosure includes providing a fan section including 30 or fewer fan blades and defining a pressure ratio less than about 1.45, providing a geared arrangement configured to drive the fan section, providing a compressor section in fluid communication with the fan section, providing a turbine section, including both a first turbine section and a second turbine section, driving the compressor section and the geared arrangement via the turbine section, and providing a plurality of exit guide vanes positioned downstream of the fan blades. A first ratio of a number of exit guide vanes to a number of fan blades is between about 0.8 and about 2.5. The exit guide vanes are provided with optimized sweep and optimized lean wherein optimized sweep means that: (a) an outer periphery of the exit guide vane is positioned to be downstream of a location of an inner periphery of the exit guide vane; and (b) a sweep angle is between about 5 degrees and about 35 degrees, and wherein optimized lean means that: (a) an outer periphery of the exit guide vane is positioned at a greater circumferential distance than an inner periphery of the exit guide vane in a direction of rotation of the fan blades; and (b) a lean angle is greater than 0 degrees and is less than or equal to about 15 degrees.

In a further embodiment of any of the forgoing embodiments, the geared arrangement defines a gear reduction ratio greater than or equal to about 2.3. The second turbine section is configured to drive the geared arrangement such that a pressure ratio across the second turbine section is greater than or equal to about 5. The fan section is configured such that a blade tip speed of each of the fan blades is less than about 1150 ft/second at a cruise condition.

In a further embodiment of any of the forgoing embodiments, the first ratio is greater than or equal to about 2.0.

These and other features of the invention will be better understood from the following specifications and drawings, the following of which is a brief description.

DETAILED DESCRIPTION

Figure 1:
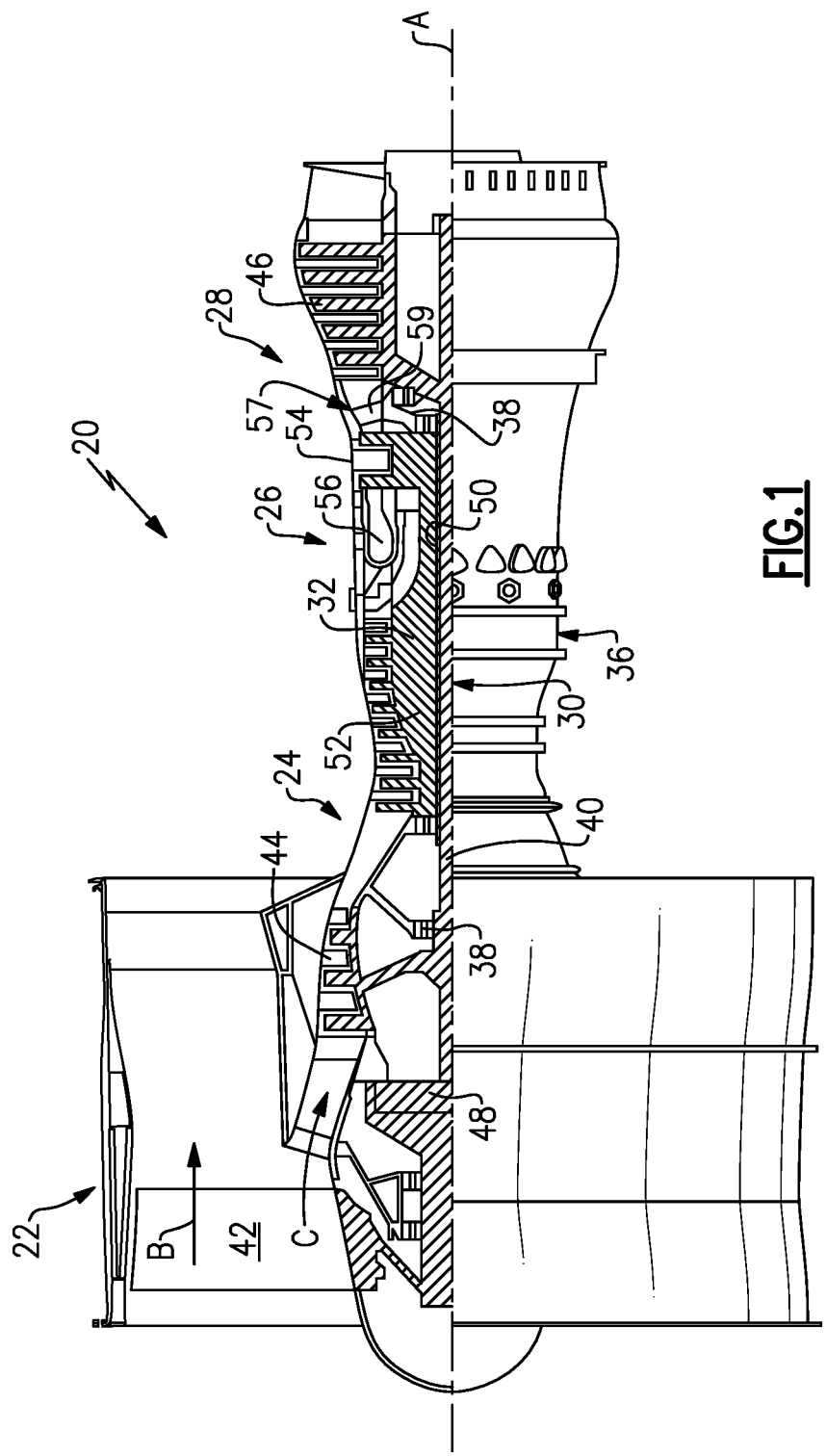
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In some examples, the gear reduction ratio is between about 2.5 and about 5.0. In other examples, the gear reduction ratio is less about 4.0. In some examples, the bypass ratio is less than about thirty (30), or more narrowly less than about twenty (20), In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second. In some examples, the fan 42 has 30 or fewer blades. In further examples, the fan 42 has 26 or fewer blades, or more narrowly 20 or fewer blades.

A method described herein, provides an acoustically optimized count and positioning of fan exist guide vanes in the geared turbofan architecture. In the case where the vane/blade ratio is low enough to generate an additional tone noise source, i.e. a "cut-on" condition, an acoustic feature should be applied to the surface of the guide vane to mitigate the additional tone noise.

Figure 2A:
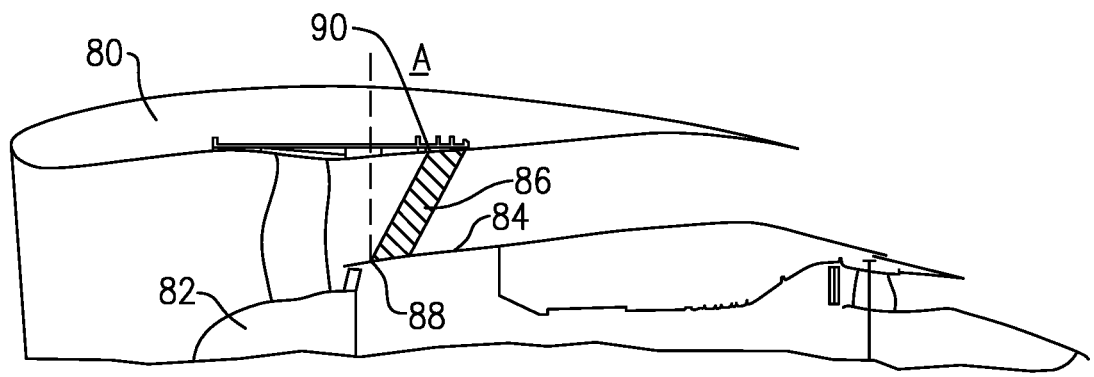
FIG. 2A shows a detail of a fan exit guide vane.

FIG. 2A shows a fan which has an exit guide vane 86 provided with any one of several noise treatment features. An outer cowl 80 is spaced outwardly of a fan rotor 82. Exit guide vanes 86 extend between an outer core housing 84 and the inner surface of the cowl 80. The guide vane 86 is actually one of several circumferentially spaced guide vanes. As mentioned above, the number of guide vanes compared to the number of rotor blades on the fan rotor control the cut-off and cut-on features of the noise produced by the fan rotor. Specifically, the ratio of guide vanes to fan blades should be between about 0.8 and about 2.5, and is described in embodiments of this disclosure.

Below some critical number the ratio can result in the noise being "cut-on". Generally this critical number is somewhere near 2. Above the critical value, the ratio of guide vanes to fan blades may result in an overall engine that sufficiently addresses the noise on its own. Thus, engines have a ratio of guide vanes to fan blades above the critical value and provide value benefits when used in a geared turbofan engine.

When the ratio is below the critical number, however, some additional acoustic feature may be in order. Three potential acoustic features are discussed below.

In FIG. 2A, the fan exit guide vane 86 is shown to have optimized sweep. Sweep means that an inner periphery 88 of the vane is upstream of the location 90 of the outer periphery of the guide vane 86. In embodiments, the sweep angle A will be greater than about 0 and less than or equal to about 35 degrees. The sweep angle A will generally be greater than or equal to about 5 degrees. In embodiments, the sweep angle A will be greater than or equal to about 15 degrees. In some embodiments, the sweep angle A is greater than about 15 degrees and is less than or equal to about 25 degrees, or more narrowly greater than about 20 degrees and less than or equal to about 25 degrees. In other embodiments, the sweep angle A is less than or equal to about 30 degrees. Optimized guide vane sweep provides a reduced noise signature for the geared turbofan.

Figure 2B:
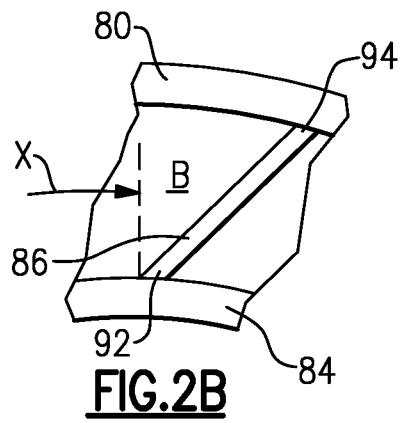
FIG. 2B shows another view of the FIG. 2A guide vane.

FIG. 2B shows that the vanes 86 may also be provided with optimized lean. In embodiments, a lean angle B will be greater than 0 and less than or equal to about 15 degrees. The lean angle B will generally be greater than or equal to about 2.0 degrees. In embodiments, the lean angle will be greater than or equal to about 7 degrees. As shown in FIG. 2B the vanes 86 have an outer peripheral surface 94 positioned at a greater circumferential distance from the inner periphery 92, where circumferential distance is defined in the direction of fan rotation. Optimized guide vane lean provides a reduced noise signature for the geared turbofan.

Figure 3A:
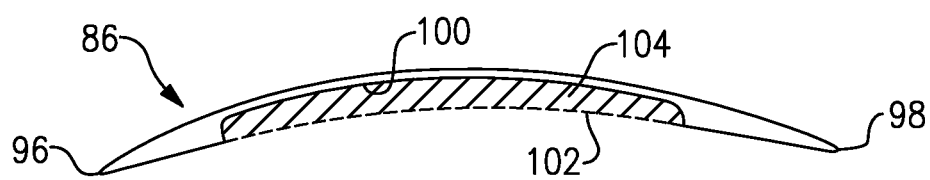
FIG. 3A shows a cross-section through a guide vane.
Figure 3B:
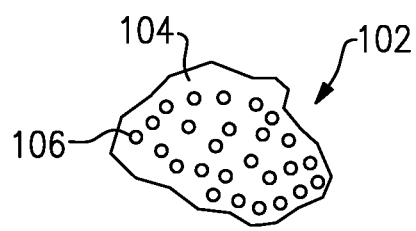
FIG. 3B shows a portion of a material incorporated into the FIG. 3A guide vane.
Figure 3C:
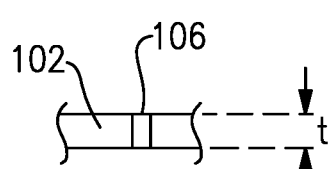
FIG. 3C shows another feature of the material.

FIG. 3A shows another guide vane 86 that has an acoustic feature positioned between the leading edge 96, and the trailing edge 98 of the vane, on the pressure surface of the airfoil. The acoustic feature may be an acoustic liner as shown in FIGS. 3A-3C. The liner has a face sheet 102 over a segmented cavity 104 sitting in an opening 100 in the vane 86. Holes 106 are in face sheet 102. These holes are typically very small. As shown in FIG. 3, a thickness t of the face sheet 102 may be defined. The holes have a diameter less than or equal to about 0.3 t. More narrowly, the diameter is less than or equal to 0.2 t. Generally, the holes will take up at least 5% of the surface area of the material.

One micro-perforated acoustic liner may be as disclosed in U.S. Pat. No. 7,540,354B2, "Microperforated Acoustic Liner," Jun. 2, 2009. The disclosure from this patent relating to this one example liner material is incorporated herein by reference in its entirety.

The several features mentioned above may all be utilized in combination, or each separately. In some cases, it may be desired to optimize the guide vane count and a non-zero sweep angle with 0 degrees of lean. Similarly, it may be desired to optimize the guide vane count and a non-zero lean angle with 0 degrees of sweep.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
    a fan section having a rotor with a plurality of fan blades, said plurality being equal to or less than 26, said fan section having a low fan pressure ratio of less than 1.45, wherein the low fan pressure ratio is measured across said fan blades alone;

a geared arrangement that drives said fan rotor;

a compressor section including a first compressor section and a second compressor section;

a turbine section including a first turbine section that drives said first compressor section, and a second turbine section that drives said second compressor section and said geared arrangement with said geared arrangement providing a gear reduction;

a plurality of exit guide vanes positioned downstream of said fan blades;

wherein a first ratio of a number of exit guide vanes to a number of fan blades being between 0.8 and 2.0; and each of said exit guide vanes defines a hollow opening covered by an acoustic liner having a perforated face sheet with a plurality of holes, said face sheet has a thickness, and a diameter of said plurality of holes in said face sheet is less than or equal 0.3 of the thickness;

wherein said plurality of holes in said face sheet extend over at least 5% of a total surface area of said face sheet;

said geared arrangement has a gear reduction ratio greater than or equal to 2.3;

wherein the second turbine section includes an inlet, an outlet and a pressure ratio of greater than 5, the pressure ratio being pressure measured prior to the inlet as related to pressure at the outlet prior to any exhaust nozzle; and wherein the fan section has a low corrected fan tip speed of less than 1150 ft/sec, and said low corrected fan tip speed is an actual fan tip speed divided by [(Tram ° R)/(518.7° R)]^0.5.

2. The gas turbine engine as set forth in claim 1, wherein said diameter is less than or equal to 0.2 of the thickness.

3. The gas turbine engine as set forth in claim 2, wherein said exit guide vanes are provided with sweep and lean.

4. The gas turbine engine as set forth in claim 3, wherein sweep means that: (a) an outer periphery of said exit guide vane is positioned to be downstream of a location of an inner periphery of said exit guide vane; and (b) a sweep angle is between 0 degrees and 30 degrees.

5. The gas turbine engine as set forth in claim 4, wherein lean means that: (a) an outer periphery of said exit guide vane is positioned at a greater circumferential distance than an inner periphery of said exit guide vane in a direction of rotation of said fan blades; and (b) a lean angle is greater than or equal to 0 degrees and less than or equal to 15 degrees.

6. The gas turbine engine as set forth in claim 3, wherein lean means that: (a) an outer periphery of said exit guide vane is positioned at a greater circumferential distance than an inner periphery of said exit guide vane in a direction of rotation of said fan blades; and (b) a lean angle is greater than or equal to 0 degrees and less than or equal to 15 degrees.

7. The gas turbine engine as set forth in claim 1, wherein said exit guide vanes are provided with sweep and lean.

8. The gas turbine engine as set forth in claim 7, wherein sweep means that: (a) an outer periphery of said exit guide vane is positioned to be downstream of a location of an inner periphery of said exit guide vane; and (b) a sweep angle is between 0 degrees and 30 degrees.

9. The gas turbine engine as set forth in claim 8, wherein lean means that: (a) an outer periphery of said exit guide vane is positioned at a greater circumferential distance than an inner periphery of said exit guide vane in a direction of rotation of said fan blades; and (b) a lean angle is greater than or equal to 0 degrees and less than or equal to 15 degrees.

10. The gas turbine engine as set forth in claim 7, wherein lean means that: (a) an outer periphery of said exit guide vane is positioned at a greater circumferential distance than an inner periphery of said exit guide vane in a direction of rotation of said fan blades; and (b) a lean angle is greater than or equal to 0 degrees and less than or equal to 15 degrees.

11. A gas turbine engine comprising:
a fan section having a plurality of fan blades, said fan section having a low fan pressure ratio of less than 1.45 measured across said fan blades alone;

a geared arrangement that drives said fan section;

a compressor section including a first compressor section and a second compressor section;

a turbine section including a first turbine section that drives said first compressor section, and a second turbine section that drives said second compressor section and said geared arrangement;

a plurality of exit guide vanes positioned downstream of said fan blades;

wherein a first ratio of a number of exit guide vanes to a number of fan blades being between 0.8 and 2.0;

said geared arrangement has a gear reduction ratio greater than or equal to 2.3;

wherein the second turbine section includes an inlet, an outlet and a pressure ratio of greater than 5, the pressure ratio being pressure measured prior to the inlet as related to pressure at the outlet prior to any exhaust nozzle;

wherein the fan section has a low corrected fan tip speed of less than 1150 ft/sec, and said low corrected fan tip speed is an actual fan tip speed divided by [(Tram ° R)/(518.7° R)]^0.5 and said fan section has 20 or fewer fan blades; and wherein said exit guide vanes are provided with sweep, wherein sweep means that: (a) an outer periphery of said exit guide vane is positioned to be downstream of a location of an inner periphery of said exit guide vane; and (b) a sweep angle is between 0 degrees and 30 degrees;

each of said exit guide vanes defines a hollow opening covered by an acoustic liner having a perforated face sheet with a plurality of holes;

said face sheet has a thickness, and a diameter of said plurality of holes in said face sheet is selected to be less than or equal to 0.3 of the thickness; and said plurality of holes in said face sheet extend over at least 5% of a total surface area of said face sheet.

12. The gas turbine engine as set forth in claim 11, wherein said sweep angle is greater than or equal to 15 degrees.

13. The gas turbine engine as set forth in claim 12, wherein said exit guide vanes are provided with lean, and lean means that: (a) an outer periphery of said exit guide vane is positioned at a greater circumferential distance than an inner periphery of said exit guide vane in a direction of rotation of said fan blades; and (b) a lean angle is greater than or equal to 0 degrees and less than or equal to 15 degrees.

14. The gas turbine engine as set forth in claim 13, wherein said lean angle is greater than or equal to 2 degrees.

15. The gas turbine engine as set forth in claim 14, wherein said diameter is less than or equal to 0.2 of the thickness.

16. The gas turbine engine as set forth in claim 13, wherein said diameter is less than or equal to 0.2 of the thickness.

17. The gas turbine engine as set forth in claim 11, wherein said exit guide vanes are provided with lean, and lean means that: (a) an outer periphery of said exit guide vane is positioned at a greater circumferential distance than an inner periphery of said exit guide vane in a direction of rotation of said fan blades; and (b) a lean angle is greater than or equal to 0 degrees and less than or equal to 15 degrees.

18. The gas turbine engine as set forth in claim 17, wherein said diameter is less than or equal to 0.2 of the thickness.

19. The gas turbine engine as set forth in claim 18, wherein said lean angle is greater than or equal to 2 degrees.

20. The gas turbine engine as set forth in claim 11, wherein said geared arrangement is between said fan section and said second compressor section.

21. A gas turbine engine comprising:
a fan section having a plurality of fan blades;
a geared arrangement that drives said fan section;
a compressor section including a first compressor section and a second compressor section;
a turbine section including a first turbine section that drives said first compressor section, and a second turbine section that drives said second compressor section and said geared arrangement;
a plurality of exit guide vanes positioned downstream of said fan blades;
wherein a first ratio of a number of exit guide vanes to a number of fan blades being between 0.8 and 2.0;
wherein said exit guide vanes are provided with lean, wherein lean means that: (a) an outer periphery of said exit guide vane is positioned at a greater circumferential distance than an inner periphery of said exit guide vane in a direction of rotation of said fan blades; and (b) a lean angle is greater than or equal to 2 degrees and less than or equal to 15 degrees;
each of said exit guide vanes defines a hollow opening covered by an acoustic liner having a perforated face sheet with a plurality of holes;
said face sheet has a thickness, and a diameter of said plurality of holes in said face sheet is selected to be less than or equal to 0.3 of the thickness; and
wherein said fan section has 20 or fewer fan blades.

22. The gas turbine engine as set forth in claim 21, wherein said exit guide vanes are provided with sweep and sweep means that: (a) an outer periphery of said exit guide vane is positioned to be downstream of a location of an inner periphery of said exit guide vane; and (b) a sweep angle is between 0 degrees and 35 degrees.

23. The gas turbine engine as set forth in claim 22, wherein said diameter is less than or equal to 0.2 of the thickness.

24. The gas turbine engine as set forth in claim 23, wherein:
said geared arrangement has a gear reduction ratio greater than or equal to 2.3;
wherein the second turbine section includes an inlet, an outlet and a pressure ratio of greater than 5, the pressure ratio being pressure measured prior to the inlet as related to pressure at the outlet prior to any exhaust nozzle; and
wherein the fan section has a low corrected fan tip speed of less than 1150 ft/sec, and said low corrected fan tip speed is an actual fan tip speed divided by $[(\text{Tram }°\text{R})/(518.7° \text{R})]^{\wedge}0.5$.

25. The gas turbine engine as set forth in claim 21, wherein:
said geared arrangement has a gear reduction ratio greater than or equal to 2.3;
wherein the second turbine section includes an inlet, an outlet and a pressure ratio of greater than 5, the pressure ratio being pressure measured prior to the inlet as related to pressure at the outlet prior to any exhaust nozzle; and
wherein the fan section has a low corrected fan tip speed of less than 1150 ft/sec, and said low corrected fan tip speed is an actual fan tip speed divided by $[(\text{Tram }°\text{R})/(518.7° \text{R})]^{\wedge}0.5$.

26. The gas turbine engine as set forth in claim 21, wherein said lean angle is greater than or equal to 2 degrees.

27. The gas turbine engine as set forth in claim 26, wherein said plurality of holes in said face sheet extend over at least 5% of a total surface area of said face sheet.

28. The gas turbine engine as set forth in claim 21, wherein said plurality of holes in said face sheet extend over at least 5% of a total surface area of said face sheet.

29. The gas turbine engine as set forth in 28, wherein said geared arrangement is between said fan section and said second turbine section.

30. The gas turbine engine as set forth in claim 21, wherein said geared arrangement is between said fan section and said second turbine section.

* * * * *